(12) United States Patent
Chamberlain

(10) Patent No.: US 7,052,028 B2
(45) Date of Patent: May 30, 2006

(54) FRAME ASSEMBLY FOR A BICYCLE

(75) Inventor: Jason L. Chamberlain, Morgan Hill, CA (US)

(73) Assignee: Specialized Bicycle Componets, Inc., Morgan Hill, CA (US)

( * ) Notice: Subject to any disclaimer, the term of this patent is extended or adjusted under 35 U.S.C. 154(b) by 0 days.

(21) Appl. No.: 10/459,398

(22) Filed: Jun. 11, 2003

(65) Prior Publication Data

(51) Int. Cl.
 *B62K 1/00* (2006.01)
(52) U.S. Cl. ...................... 280/279; 280/276
(58) Field of Classification Search ............. 280/279, 280/280, 276, 270
 See application file for complete search history.

(56) References Cited

U.S. PATENT DOCUMENTS

| | | | | |
|---|---|---|---|---|
| 3,866,946 | A * | 2/1975 | Robison | 280/279 |
| 4,600,207 | A * | 7/1986 | Zosi | 280/279 |
| 5,273,301 | A * | 12/1993 | Klein | 280/279 |
| 5,938,225 | A * | 8/1999 | Scheibe et al. | 280/279 |
| 6,609,437 | B1 * | 8/2003 | Jiang | 74/551.1 |
| 6,682,088 | B1 * | 1/2004 | Lin | 280/280 |
| 6,783,158 | B1 * | 8/2004 | Nakagawa et al. | 280/785 |
| 2003/0038449 | A1 * | 2/2003 | Gueugneaud | 280/279 |

OTHER PUBLICATIONS

Ellsworth Internet Materials, http://www.ellsworthbikes.com/bikes/id/index.cfm dated Nov. 18, 2004 in 5 pages.

* cited by examiner

*Primary Examiner*—Lesley D. Morris
*Assistant Examiner*—L. Lum
(74) *Attorney, Agent, or Firm*—Knobbe Martens Olson & Bear LLP

(57) ABSTRACT

A head tube for a bicycle frame that accommodates oversized frame tubing and the use of a standard sized head set. Preferably, the head tube includes a body defining a pair of lateral extensions that cooperate with the body to define an outer surface configured to receive at least a portion of a frame tube. In addition, preferably, the head tube defines a wall thickness that is thicker at the bottom of the head tube than the thickness at the top of the head tube. In addition, preferably, the wall thickness is greater at both of the top and the bottom of the head tube than the wall thickness of the middle of the head tube. Preferably, in at least a portion of the head tube, the wall thickness is thicker in a forward side than the thickness in a rearward side.

19 Claims, 20 Drawing Sheets

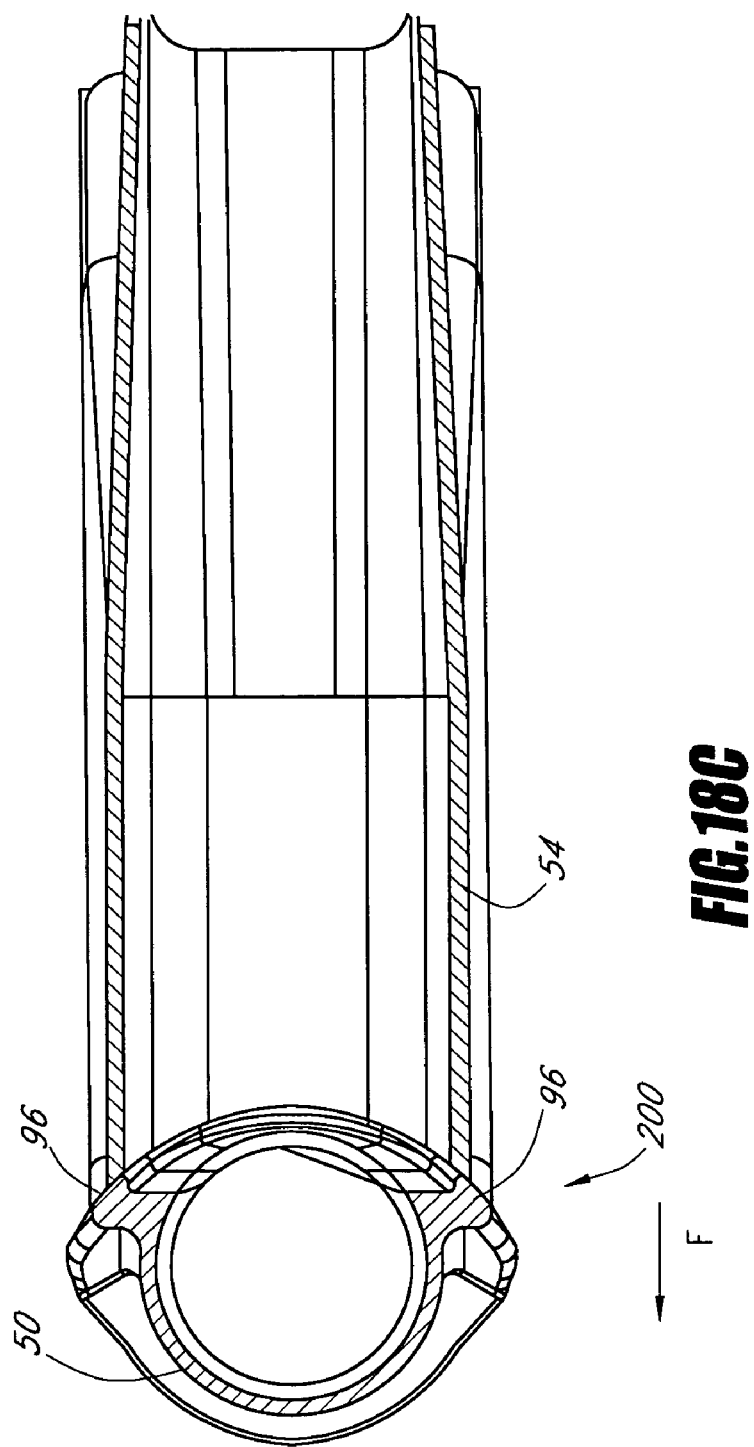

FRAME ASSEMBLY FOR A BICYCLE

BACKGROUND OF THE INVENTION

1. Field of the Invention

The present invention generally relates to a bicycle frame. More particularly, the present invention relates to a head tube of a bicycle frame, which has a non symmetrical geometry.

2. Description of the Related Art

Bicycles with frames fabricated from oversized aluminum tubing have become increasingly popular. Unlike steel, aluminum cannot be brazed, so that joints between the tubes of most aluminum bicycle frames have to be welded. A critical joint in the manufacture of modern bicycle frames is the joint between the head tube, the top tube, and the down tube. The fork acts as a long lever arm and can exert significant amounts of stress on the head tube. The arrival of suspension bikes in the market place with stiff long-travel suspension forks have made the design of this junction even more critical.

Top tubes and down tubes have been getting bigger to achieve greater strength and rigidity. This has created problems in trying to accommodate the larger top and down tubes. Commonly, the top and down tubes are down sized at the head tube end to mate with a standard sized head tube. However, this reduces the effectiveness of the oversized tubing use for the top tube and down tube. An alternative approach has been to increase the diameter of the head tubes and the associated steer tube bore. While the larger diameter head tube avoids the need to crimp the top and down tube, the approach requires nonstandard bearings and can require a nonstandard steer tube. Significantly, this approach can add undesired weight, which is directly contrary to the desires of the market. Typically, manufacturers have accommodated these larger top and down tubes by crimping the tubes at their juncture with the head tube. This obviously creates strength and repeatability issues at the juncture.

The bicycle frames with oversized down tubes and top tubes are traditionally constructed such that one of the top tube and down tube is mitered to the head tube only, and the other of the top tube and down tube is mitered to both the head tube and the down tube. This method of manufacture makes it more difficult to use complex cross sectional frame tubing. Further more, having to crimp down the end of the top and down tubes and then having to perform these complex cuts makes the situation even more difficult. This type of cutting process needs either expensive equipment if the cutting process is automated or skillful operators if the cutting process is done manually.

SUMMARY OF THE INVENTION

Therefore, there is a need for a head tube that will both accommodate oversized tubing and use a standard head set, while maintaining a light weight.

A preferred embodiment is a head tube for a bicycle. The head tube includes a body having an inner surface defining an opening. The opening has a first radius sized and shaped to receive a standard size steer tube and defines a first axis. The body further defines an annular outer surface and includes an upper portion, a lower portion, and a middle portion disposed between the upper portion and the lower portion. A least one of the portions at least partially defines a first extension extending radially outward from the outer surface. The first extension defines a first extension surface cooperating with at least a portion of the outer surface to accept the attachment of at least a portion of a frame tube.

A preferred embodiment is a head tube for a bicycle. The head tube includes a body having an inner surface defining an opening. The opening has a first radius sized and shaped to receive a standard size steer tube and defines a first axis. The body further defines an annular outer surface defining a second diameter. The body includes an upper portion, a lower portion, and a middle portion disposed between the upper portion and the lower portion. The outer surface has a portion of constant radius profile surface for accepting the attachment of frame tubes, wherein the first axis and the second axis are non-coaxial.

A preferred embodiment is a head tube for a bicycle including a body having an inner surface defining an opening sized and shaped to receive a standard size steer tube and defining a first axis. The body further defines an annular outer surface defining a second diameter and includes an upper portion, a lower portion, and a middle portion disposed between the upper portion and the lower portion. The upper portion has a front portion and back portion and the lower portion has a front portion and back portion. The middle portion also has a front portion and back portion. The upper portion has a greater wall thickness than the middle portion and the lower portion has a greater wall thickness than the middle portion.

A preferred embodiment is a method of manufacturing a bicycle head tube including the step of providing a forging die containing at least a partial relieved form of the head tube. Providing a forging ram containing at least a partial relieved form of the head tube. Providing a blank of roughly the mass and roughly the external dimensions of the head tube and utilizing the forging die and the forging ram to forge the blank into a work piece defining the external dimensions of the bicycle head tube. The method also includes creating an internal opening in the work piece sized and shaped for securing a bicycle steer tube there through.

A preferred embodiment is a method of manufacturing a bicycle head tube junction including the steps of providing a forging die containing at least a partial relived form of the head tube. Providing a forging ram containing at least a partial relieved form of the head tube. Providing a blank of roughly the mass and roughly the external dimensions of the head tube and forging a blank into a work piece defining the external dimensions of the bicycle head tube. The method further includes creating an internal opening in the work piece sized and shaped for securing a bicycle steer tube there through. Providing a top tube and a down tube, each having a first end, a second end, and an outer surface and an inner surface defining a wall. The outer surface bounds a transverse cross-sectional area at each first and second end. The method additionally includes providing a recess in the first ends of the tubes sized to mate with a corresponding member on the head tube and attaching the recessed ends of the tubes to the corresponding member on the head tube.

BRIEF DESCRIPTION OF THE DRAWINGS

These and other features, aspects and advantages of the present invention are described below with reference to drawings of preferred embodiments, that are intended to illustrate, but not to limit, the present invention. The drawings contain five figures.

FIG. 9A is a cross-sectional view of an upper portion of the head tube, taken along line 9A—9A of FIG. 4. FIG. 9B is a cross-sectional view of a middle portion of the head tube, taken along line 9B—9B of FIG. 4. FIG. 9C is a cross-sectional view of a lower portion of the head tube, taken along line 9C—9C of FIG. 4.

FIGS. 18A–18C are cross-sectional views of the head tube junction of FIG. 15. FIG. 18A is a cross-sectional view of an upper portion of the junction, taken along line 18A—18A of FIG. 15. FIG. 18B is a cross-sectional view of a middle portion of the head tube, taken along line 18B—18B of FIG. 15. FIG. 18C is a cross-sectional view of a lower portion of the head tube, taken along line 18C—18C of FIG. 15.

DETAILED DESCRIPTION OF THE PREFERRED EMBODIMENT

A preferred head tube is described in connection with a preferred embodiment of an off-road bicycle. First, a preferred embodiment of a bicycle will be described in general detail, after which a preferred embodiment of a head tube will be described in detail. Although the head tube described herein is preferred for use in connection with an off-road bicycle as described herein, one of skill in the art will appreciate that embodiments of the head tube may be used in other suitable environments as well.

A. Overview of the Bicycle

Figure 1:
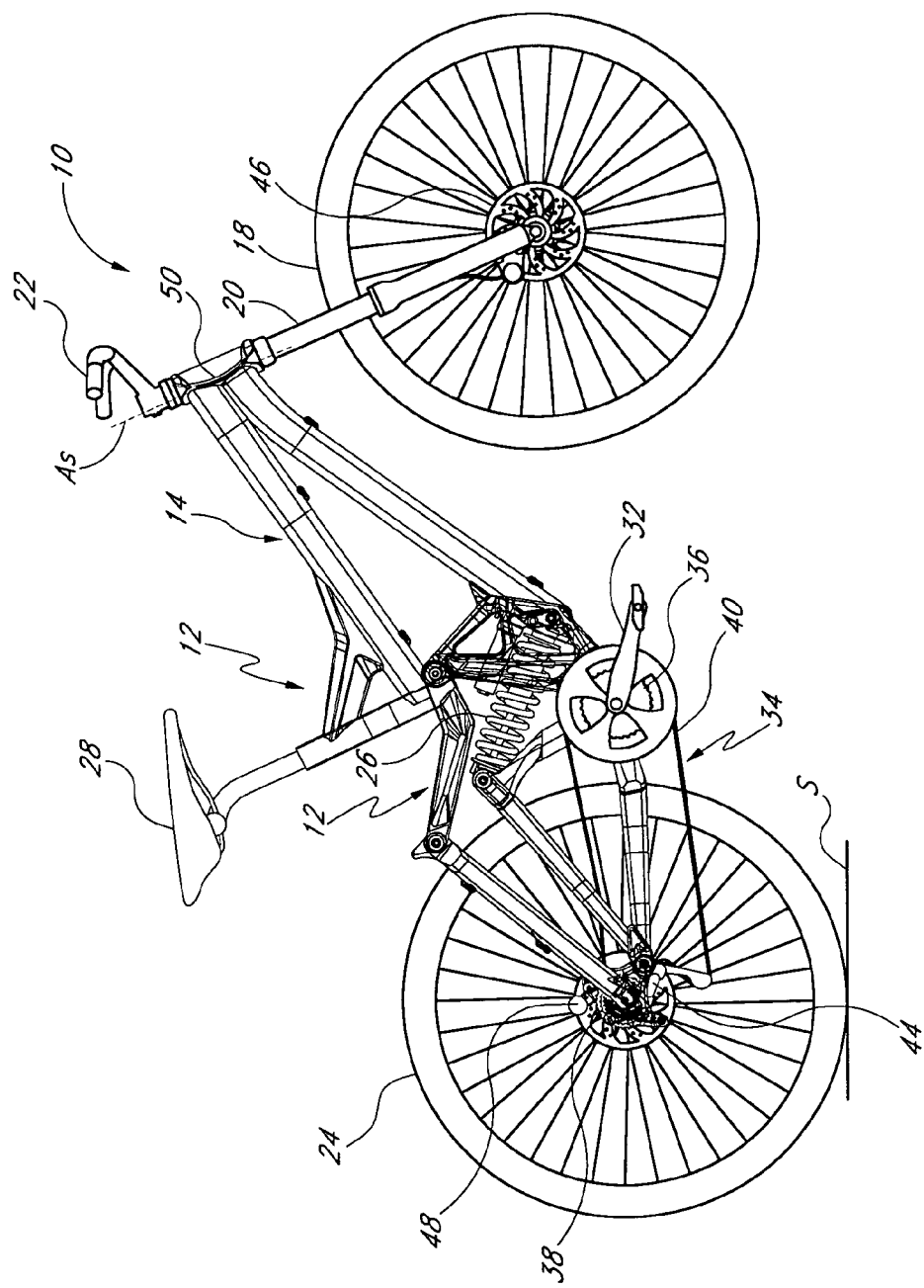
FIG. 1 is a side elevational view of an off-road bicycle, or mountain bike, incorporating a bicycle frame having certain features, aspects and advantages of the present invention.

FIG. 1 illustrates an off-road bicycle, or mountain bike 10. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. In addition, relative heights are generally expressed as elevations from a horizontal surface S upon which the bicycle 10 is supported in an upright position. Similarly, relative forward and rearward positions are expressed as distances from a vertical axis that is normal to the horizontal surface S. In several figures, an arrow F indicates a direction of forward movement of the bicycle 10. The above-described coordinate system is provided for the convenience of describing the illustrated embodiment, and is not intended to limit the scope of the present invention.

The bicycle 10 includes a frame assembly 12 comprised of a main frame 14 and an articulating frame, or sub-frame 16, pivotally supported relative to the main frame 14. The bicycle 10 also includes a front wheel 18 carried by a front suspension assembly, or suspension fork 20. A steerer tube (not shown) is journaled for rotation about a steering axis $A_S$ defined by the main frame 14. A handlebar assembly 22 is connected to an upper end of the suspension fork 20 and is operable to permit a rider of the bicycle 10 to rotate the front wheel 18 about the steering axis $A_S$.

A rear wheel 24 of the bicycle 10 is carried by the subframe 16. A shock absorber 26 is pivotally connected to both the main frame 14 and the subframe 16 to provide resistance to articulating motion of the subframe 16 relative to the main frame 14 and, thus, provide resistance to the suspension travel of the rear wheel 24. A seat assembly 28 is supported above the bicycle frame 12 at a position behind the handlebar assembly 22 and provides support for a rider of the bicycle 10.

A pedal crank assembly 32 is rotatably supported by the bicycle frame 12 and drives a multi-speed chain drive arrangement 34. The multi-speed chain drive arrangement 34 preferably includes a plurality of sprockets, or chain rings 36, rotatably connected to the pedal crank 32. Typically, three chain rings 36 of varying size are mounted to the pedal crank 32. The chain drive arrangement 34 also includes a plurality of sprockets, or cogs 38, drivingly coupled to the rear wheel 24. A drive chain 40 drivingly interconnects a selected chain ring 36 with a selected cog 38 to transfer torque from the pedal crank assembly 32 to the rear wheel 24. Preferably, front and rear derailleurs 42, 44 are supported by the bicycle frame 12 and are configured to move the drive chain 40 to a selected one of the chain rings 36 and rear cogs 38, respectively.

The bicycle 10 also includes front and rear brake systems 46, 48 for slowing and stopping the bicycle 10. Although the illustrated brakes 46, 48 are disc-type brakes, other suitable brake systems may also be used, such as rim-type brakes for example. Rider controls (not shown) are typically provided on the handlebar assembly 22 and are operable to control shifting of the front and rear derailleurs 42, 44 and the front and rear brake systems 46, 48.

Figure 2:
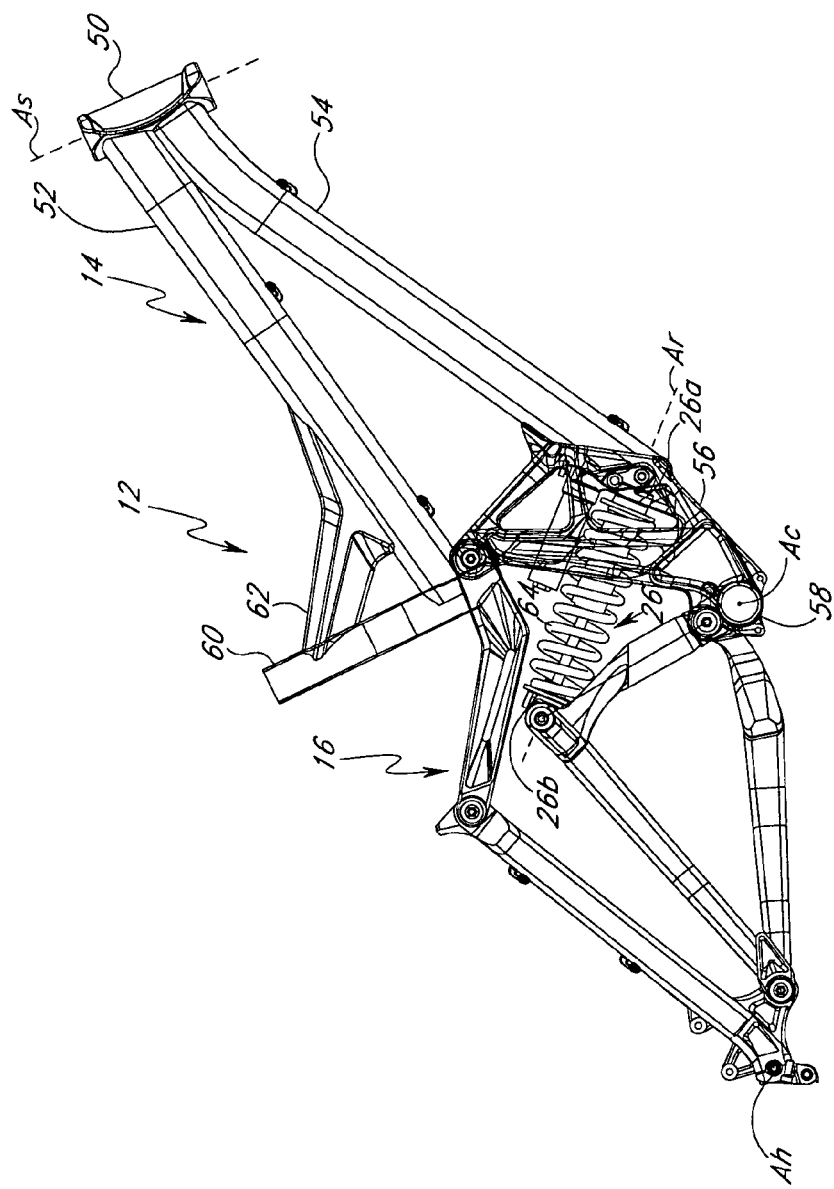
FIG. 2 is a side elevational view of the bicycle frame of FIG. 1 with certain components of the bicycle removed for the purpose of clarity.
Figure 3:
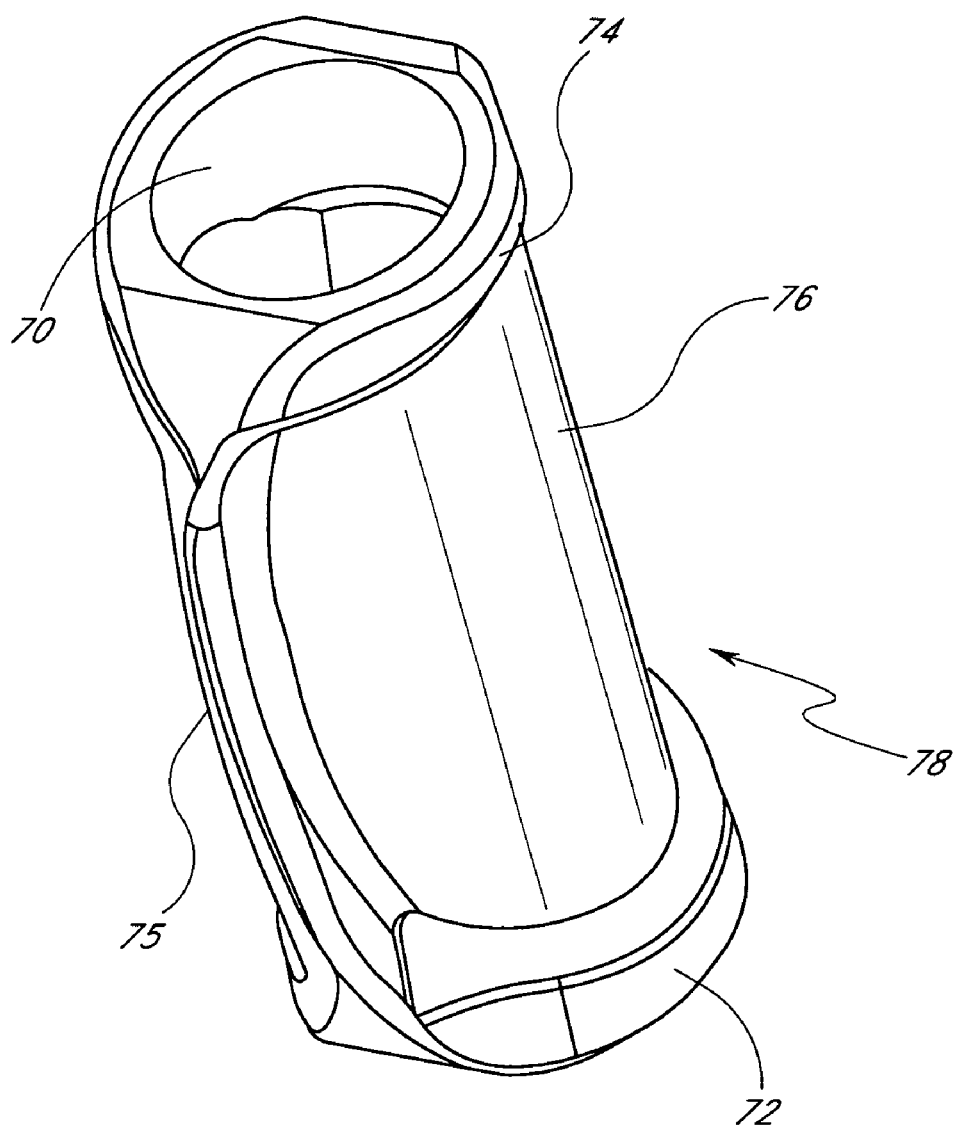
FIG. 3 is a perspective view of a head tube having certain features, aspects and advantages of the present invention.

With reference to FIG. 2, the bicycle frame 12 and rear shock absorber 26 are illustrated with the remaining components of the bicycle 10 removed for clarity. As described above, preferably, the bicycle frame 12 is primarily comprised of a main frame 14 and an articulating frame, or subframe 16. The main frame 14 includes a head tube 50 which defines the steering axis $A_S$ of the bicycle frame 12. Desirably, the steering axis $A_S$ is canted rearwardly from a vertical axis. The head tube 50 is configured to rotatably support the front suspension 20 and, thus, the front wheel 18 of the bicycle 10.

A top tube 52 and a down tube 54 extend in a rearward direction from the head tube 50 and diverge from one another when moving toward their rearward ends. A bottom bracket support 56 extends between the rearward ends of the top tube 52 and the down tube 54 and together therewith defines a generally triangular shape. The bottom bracket support 56 includes a bottom bracket shell 58, which supports the pedal crank assembly 32 (FIG. 1) for rotation about a crank axis $A_c$.

A seat tube 60 extends in an upward direction from a rearward end of the top tube 52 and, preferably, is canted rearwardly from a vertical axis. The seat tube 60 supports the seat assembly 28 shown in FIG. 1. Desirably, a gusset 62 extends from a forward side of the seat tube 60 to an upper side of the top tube 52 to provide additional strength to the seat tube 60.

Preferably, the main frame 14 is constructed of individual components, as described above, which are fabricated from a metal material, such as aluminum or steel, and welded together. Desirably, the bottom bracket support 56 is created from a metal material by a forging process and, thus, benefits from the strength and durability advantages that inherently result from the forging process. Preferably, the articulating frame 16 and the shock absorber 26 are directly supported by the bottom bracket support 56.

However, in alternative embodiment, the main frame 14 may be constructed in a more conventional fashion wherein the forged bottom bracket support member 56 is omitted and the articulating frame 16 and shock absorber 26 may be pivotally connected to the welded-up tubes comprising the main frame 14. Further, other suitable constructions of the main frame 14, including non-triangular constructions, may also be used, such as a monocoque construction, for example. In addition, alternative materials such as composites may also be used in whole or in part to construct the main frame 14 and/or articulating frame 16, as will readily be appreciated by one of skill in the art. The illustrated embodiment is preferred, however, for at least the reasons discussed herein.

As described above, the illustrated bicycle frame 10 includes a shock absorber 26 operably positioned between the main frame 14 and the subframe 16. Desirably, the shock absorber 26 is configured to provide both a spring force and a damping force in response to relative movement between the subframe 16 and the main frame 14, as is known in the art. The spring force is related to the relative position between the subframe 16 and the main frame 14 while the damping force is related to the relative speed of movement between the subframe 16 and the main frame 14.

Although the illustrated shock absorber 26 incorporates a coil type spring 64, other suitable suspension springs, such as air springs, for example, may also be used. Preferably, the damping system comprises a piston movable within a fluid cylinder of the shock absorber 26. Desirably, the piston forces hydraulic fluid within the fluid chamber through one or more restrictive flow paths to generate a damping force when the shock absorber 26 is both extending and compressing, as is known in the art. In addition, other types of damping arrangements, such as inertia activated and position sensitive arrangements, may also be used, as well be readily understood by one of skill in the art.

As described above, the subframe 16 is configured to support the rear wheel 24 (FIG. 1) for a movement throughout a suspension travel path relative to the main frame 14 from a relaxed position, substantially as illustrated in FIG. 2, to a compressed position, wherein the subframe 16 is pivoted in an upward direction relative to the main frame 14. Preferably, the subframe 16 is a multiple linkage assembly. That is, preferably, the subframe 16 includes a plurality of linkage members pivotally interconnected with one another. However, in alternative arrangements, a single link member may carry the rear wheel 24 for movement in a simple, arcuate suspension travel path relative to the main frame 14.

B. Detailed Description of the Head Tube

The head tube 50 is described in greater detail with reference to FIGS. 3–9. The head tube 50 rotatably secures the steer tube 66 (illustrated in phantom in FIG. 5) within an opening 70 of the head tube 50. The opening 70 extends lengthwise through the head tube 50 and, preferably, defines the steering axis $A_S$.

Figure 4:
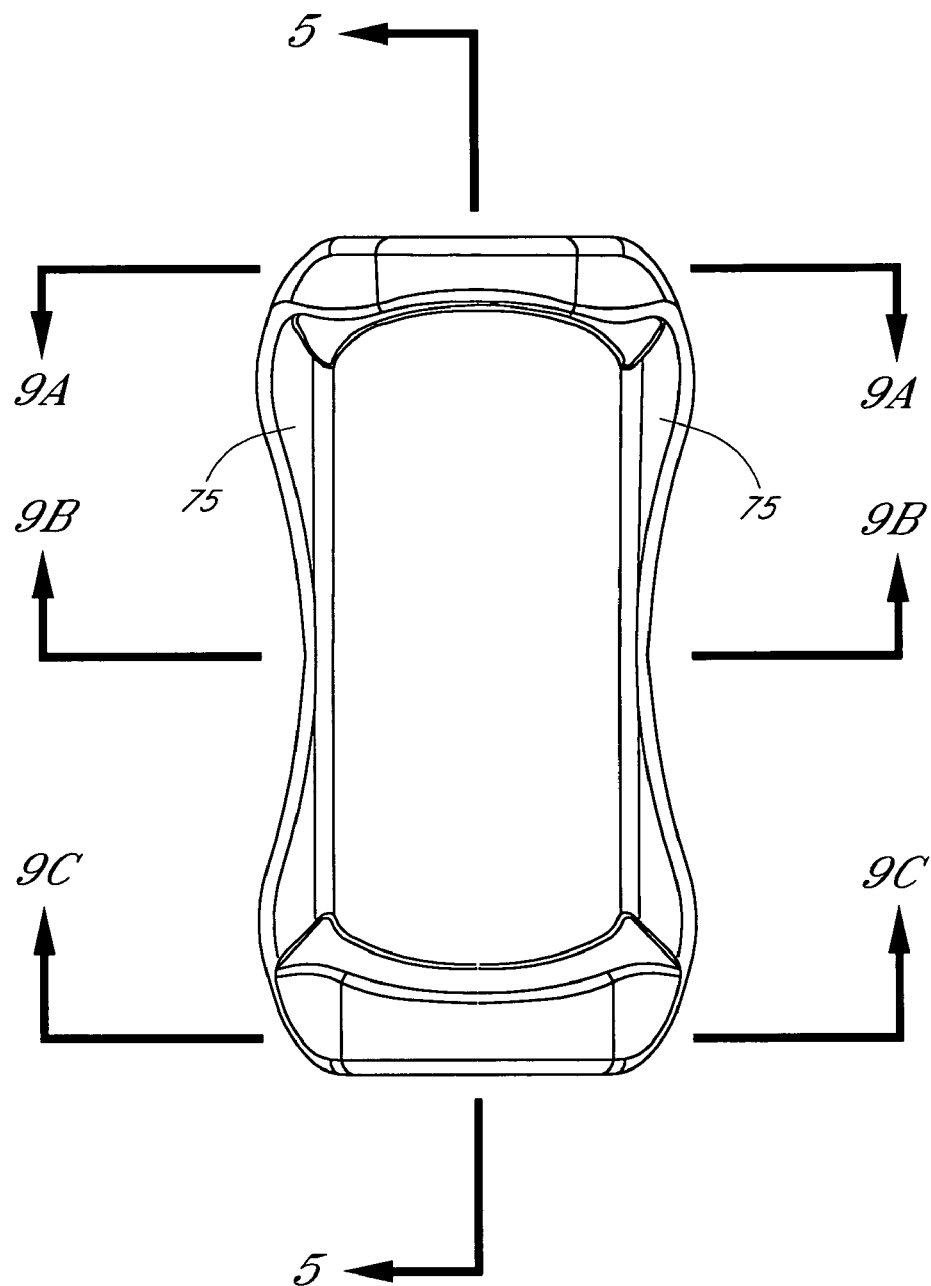
FIG. 4 is a front view of the head tube of FIG. 3.
Figure 5:
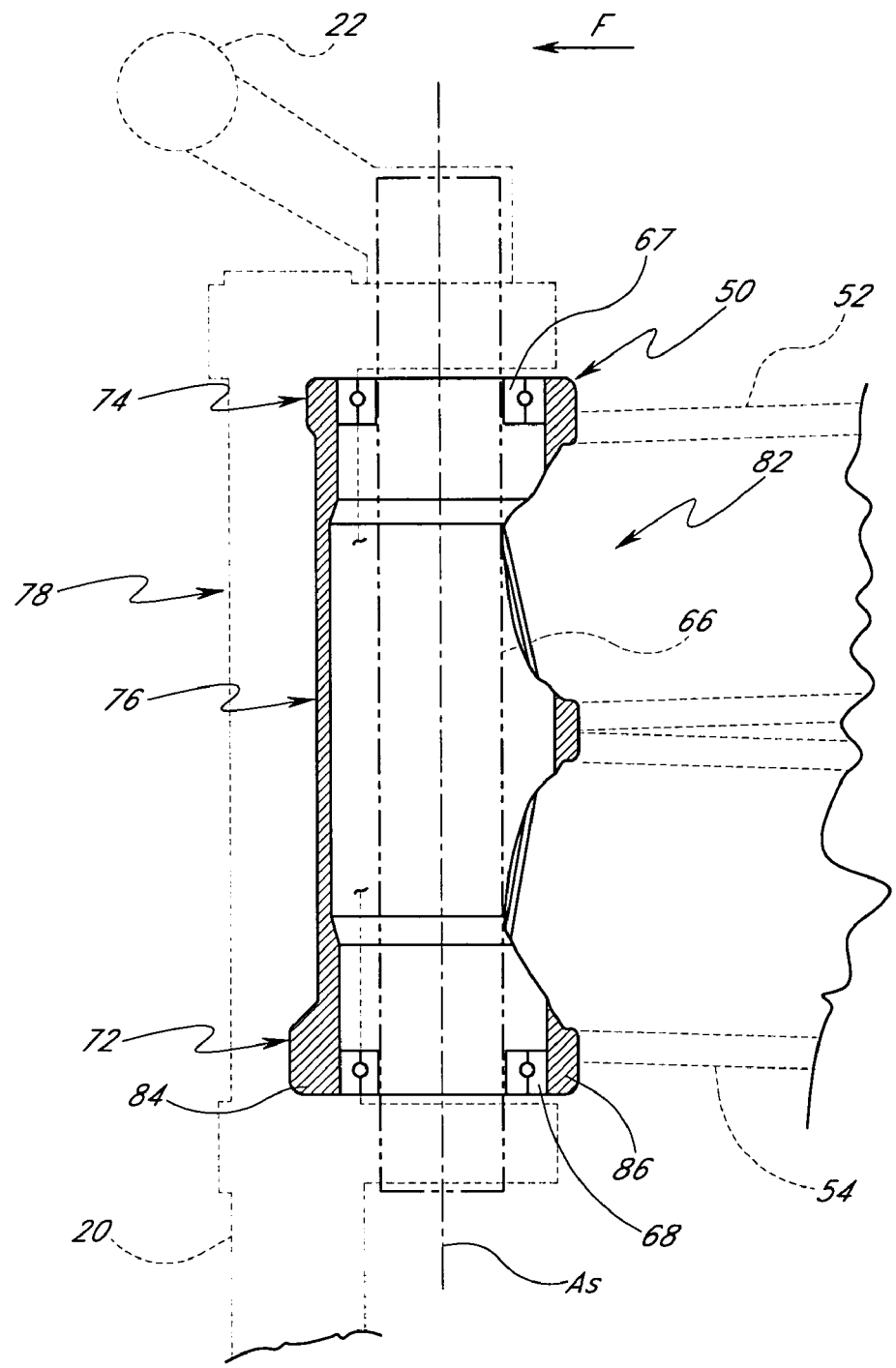
FIG. 5 is a cross-sectional view of the head tube of FIG. 3, taken along the line 5—5 of FIG. 4. A front suspension fork assembly, handlebar assembly and a steer tube of the bicycle are shown in phantom.

As illustrated in FIG. 4, from a front view the head tube 50 preferably has a generally hourglass outer shape. With reference to FIG. 5, a lower reinforced wall portion 72 of the head tube 50 preferably is disposed at a lower end head tube 50, nearest the front suspension fork assembly 20, and an upper reinforced wall portion 74 preferably is disposed at an upper end of the head tube 50, near the handle bar assembly 22. As illustrated in FIG. 5, the steer tube 66 interconnects the handlebar assembly 22 and the front suspension fork assembly 20. A head set assembly includes upper and lower bearings 67, 68 (shown schematically in FIG. 5), which support the steer tube 66 relative to the head tube 50. Preferably, the head set assembly includes upper and lower headset "cups", which are press fit into the head tube 50 and define bearing surfaces, or races, for the bearings 67, 68. The reinforced portions 72, 74 reinforce and provide additional support for standard size bearing races (not shown) of the headset assembly (not shown).

The reinforced portions 72, 74 each desirably comprise an annular ring at an end of the head tube 50. These annular ring portions 72, 74 desirably have a thickness greater than the average wall thickness of a middle portion 76 of the head tube. Furthermore, the lower reinforced wall portion 72 is desirably thicker than the upper reinforced wall portion 74 because the lower portion 72 is subjected to more force than the upper portion 72. The force acting on the lower portion 74 originates primarily from the front fork 22 (due to impact forces applied to the front wheel 18), which has a relatively long moment arm (measured from the front wheel 18 to the lower bearing 68). In contrast, the upper reinforced portion is subjected primarily to force originating from the handle bar assembly 22, which has a relatively smaller moment arm (measured from the handlebar assembly 22 to the upper bearing 67).

To reduce the weight of the reinforced head tube 50, the head tube preferably has a lower wall thickness in areas that experience less stress under normal operating circumstances. A head tube reinforced without consideration of non-critical and critical stress areas would have considerably more mass, and weigh considerably more, than the illustrated head tube 50 made from the same material.

The head tube 50 is subjected to very strong forces acting generally in the fore and aft directions. As described above, the fork 22 acts as a long lever arm on the head tube 50 and amplifies forces experienced by the front wheel 18. Over time, the lower end (the area generally analogous to the reinforced portion 72) of a conventional head tube may ovalize as a result of being subjected to cyclic fore and aft forces. To ovalize in terms of head tube technology means to deform from a round geometry to an oblong geometry due to forces subjected in a single plane. Thus, in the present situation a conventional head tube tends to ovalize such an opening of the lower portion of the head tube becomes oblong, with the longer axis extending in a fore-aft direction, or along the length of the bicycle 10. The reinforced portions 72, 74 add strength to resist the damaging effects of the described planar forces, which are amplified by the moment arm of the fork 20 and wheel 18 combination.

Preferably, the front portion 78 of the head tube 50 is not symmetrical to the back portion 82 of the head tube, in order to save weight by eliminating material in lower stress areas of the head tube 50. The back portion 82 of the head tube 50 is supported by the top tube 52 and the down tube 54 (FIG. 2, shown in phantom in FIG. 5) and, therefore, requires less wall structure to resist ovalization. The partial cross-sectional view in FIG. 5 illustrates that the thickness of the back portion 86 of the reinforced portion 72 preferably is smaller than the thickness of the front portion 84 of the reinforced portion 72, because it is supported by the frame structure that it is connected with. Providing the back portion 86 with the same thickness as desirable in the front portion 84 would add unnecessary weight.

Therefore, the illustrated head tube 50 preferably is not symmetrically designed, about a lateral axis passing through the steering axis $A_S$, because the head tube 50 is reinforced in critical areas and remains light in weight with thinner wall thickness in less critical areas, taking into account the reinforcement provided by the remainder of the frame 12 (e.g., the top tube 52 and down tube 54).

Further weight savings are possible by configuring the middle portion 76 of the head tube 50 such that an outer surface thereof forms a depression between the two reinforced areas 72 and 74. The front middle portion of the head tube is subjected to little stress when compared to the upper and lower reinforced portions 72, 74. Desirably, the wall thickness of the head tube 50 in this area is reduced, which results in a main outer annular surface between the upper and lower reinforcing portions, 74 and 72, being recessed relative the front portion of the upper and lower reinforcing portions 74 and 72.

It would be simpler to manufacture a head tube that was symmetrical front to back, but doing so would add mass and weight, or in the alternative, would result in a weaker head tube 50 susceptible to ovalization if weight is reduced all around.

With reference to FIGS. 3, 4, 6, 7 and 9A–9C, preferably, a pair of extensions, flanges 75, extend in a lateral direction from approximately a midpoint of the head tube 50. Preferably, the flanges 75 extend substantially the entire length of the head tube 50. Desirably, the back side 82 of the head tube 50, including a back side surface of the flanges 75 and the main body of the head tube 50, forms a continuous curved surface 90 for receiving the attachment of the top tube 52 and down tube 54 of the main frame 14. The continuous curved surface 90 preferably has a constant radius 92 from a center point 94, which preferably is offset from the central axis of the opening 70 (the steering axis $A_S$). As described above, such a construction permits the opening 70 to be a standard size and permits the surface 90 to have a larger, and preferably substantially constant, radius, while simultaneously keeping the lengthwise dimension of the head tube 50 relatively small and keeping the overall weight of the head tube 50 relatively low. Furthermore, the strength-to-weight ratio of the head tube 50 is increased over conventional head tubes.

Desirably, the radius 92 is proportional in size to the widest dimension of the top tube 52 and down tube 54. The radius 92 preferably is larger than one half the widest dimension of the top tube 52 and down tube 54 to provide ample weld surface 96 on which to create a joint between the head tube 50, the top tube 52 and down tube 54. Desirably, the radius 92 is at least about 1 inch. More desirably, the radius 92 is at least about 1.25 inches and, preferably, at least about 1.375 inches.

Figure 6:
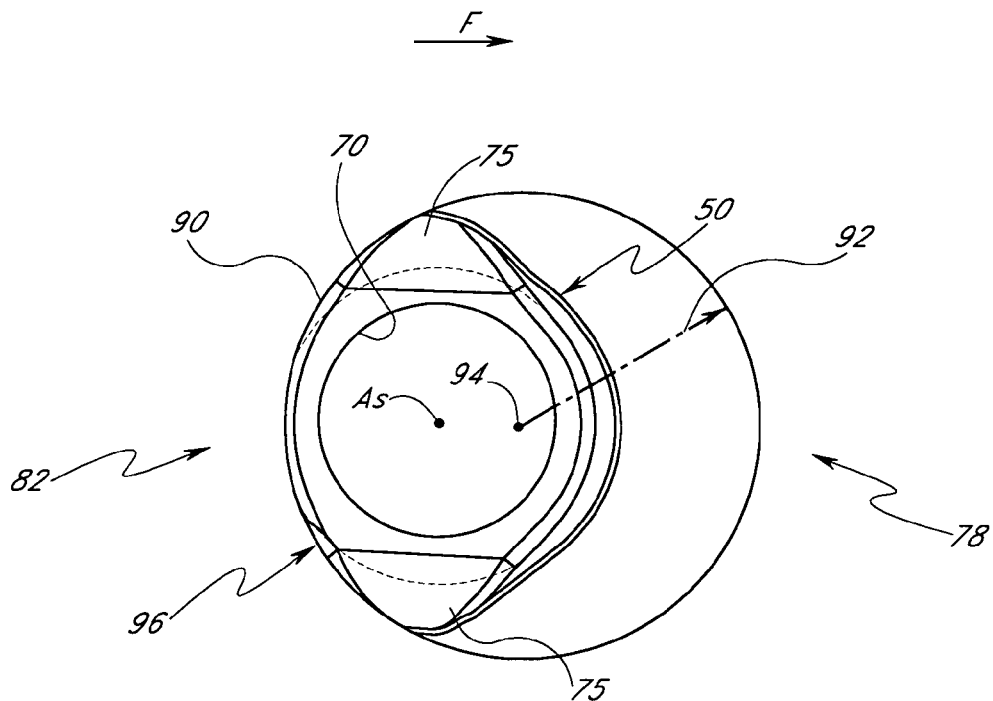
FIG. 6 is a top view of the head tube of FIG. 3.

In FIG. 6, the radius 92 is shown defining a circle in dashed lines. This circle represents the size a convention head tube would have to be to provide the same weld surface area of the present embodiment. However, the preferred head tube 50 disclosed herein provides a comparable weld surface, but with a much lower weight and possessing the ability to utilize standard sized bearings 67, 68, which support a steer tube 66 typically having a diameter of between about 1 and 1.5 inches, without the need for an adapter assembly. In order to accommodate a top tube 52 and a down tube 54 of a typical size utilized for off-road, or mountain bike, frame assemblies, desirably the radius 92 is between about 1 and 2 inches. More desirably, the radius 92 is between about 1.125 and 1.75 inches and, preferably, between about 1.25 and 1.5 inches. However, a head tube may be produced having a radius 92 with other values for other applications, or for use in connection with other frame constructions.

As described above, the illustrated head tube 50 provides a desirable level of strength at a relatively low weight. Desirably, a head tube 50 intended for use in a mountain bike frame assembly 12 weighs less than about 200 grams. More desirably, such a head tube 50 weighs less than about 170 grams and, preferably, weighs less than about 140 grams.

The continuous curve of the weld surface 96 allows the top tube 52 and down tube 54 to be cut, or mitered, with a simple circular cut, that will provide an efficient matching surface on the top tube 52 and bottom tube 54 for attaching to the head tube 50. Desirably, the circular cut in the top tube 52 or down tube 54 has a radius within about 0.01 inches of the radius 92 of the weld surface 96 of the head tube 50. More desirably, the radius of the circular cut in the top tube 52 or down tube 54 has a radius that is the same as the radius 92.

By providing a head tube 50 that will receive a simply, or circular cut top tube 52 and bottom tube 54, tubes of varying and exotic cross sectional profiles can be used easily, without the concern associated with filling gaps created by poorly cut weld surfaces, which often result in non-circular cuts. Such an arrangement simplifies manufacturing in comparison to other methods for producing a reinforced head tube, which may require non-circular miter cuts in the top and down tubes. For example, in a head tube having an outer surface thereof oval in shape to increase the wall thickness in the forward and rearward sides, the miter cut in the top and down tubes preferably are also oval in shape, which cannot be accomplished by a standard drilling operation. Instead, a more complex method must be used to create the miter cuts in the top tube and down tube, which typically both increases costs and reduces accuracy. As described above, a precise fit between the outer surface of the head tube and the cut surfaces of the top and down tubes is highly beneficial in providing a strong welded joint.

In another embodiment of the present head tube 50, the outer surface of the back portion 82 defines a flat plane and frame tubes would be provided with a flat mating surfaces to abut at right angles to the flat back portion 82 of the head tube 50.

Figure 7:
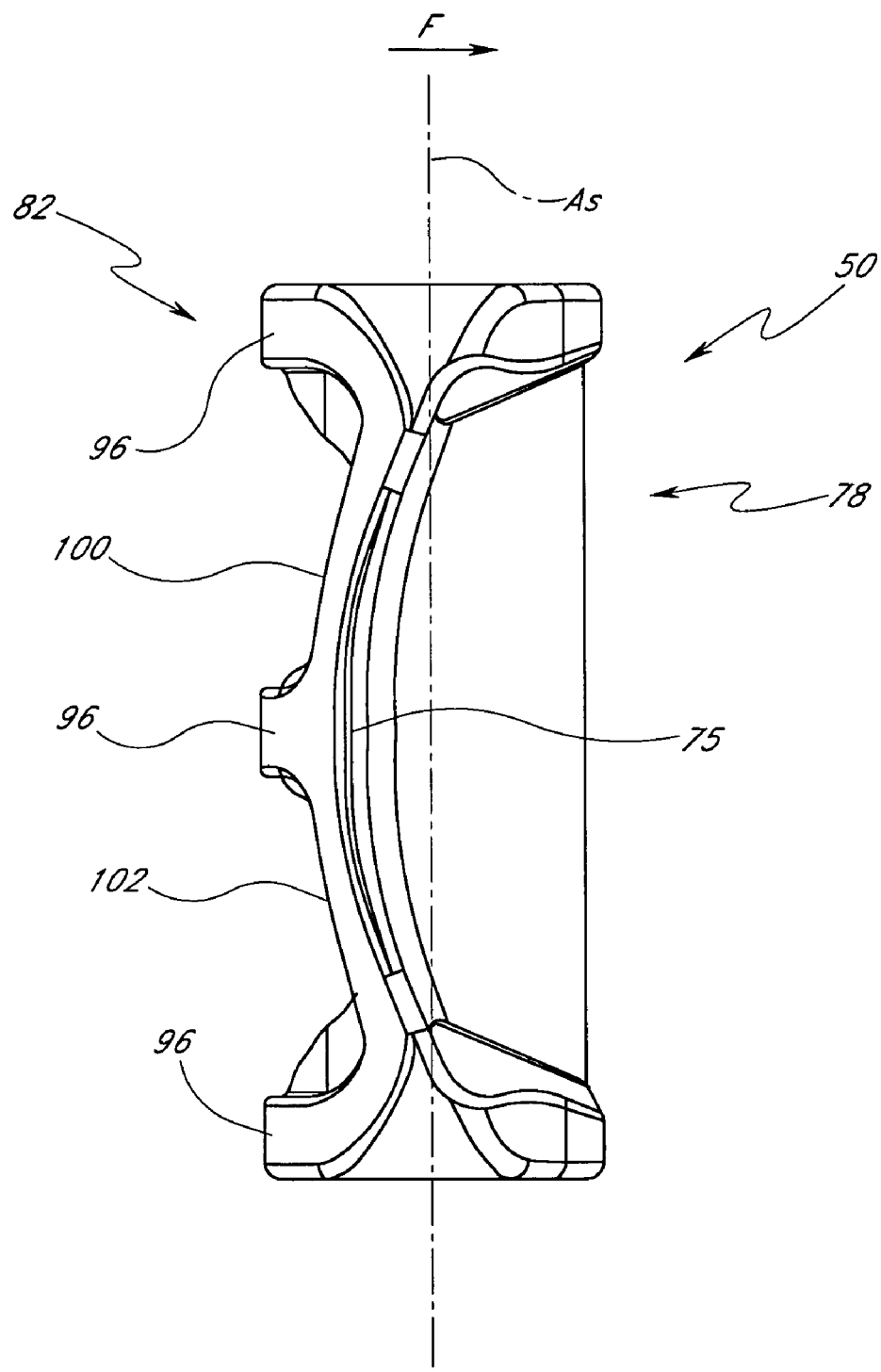
FIG. 7 is an elevational view of a right side of the head tube of FIG. 3.
Figure 8:
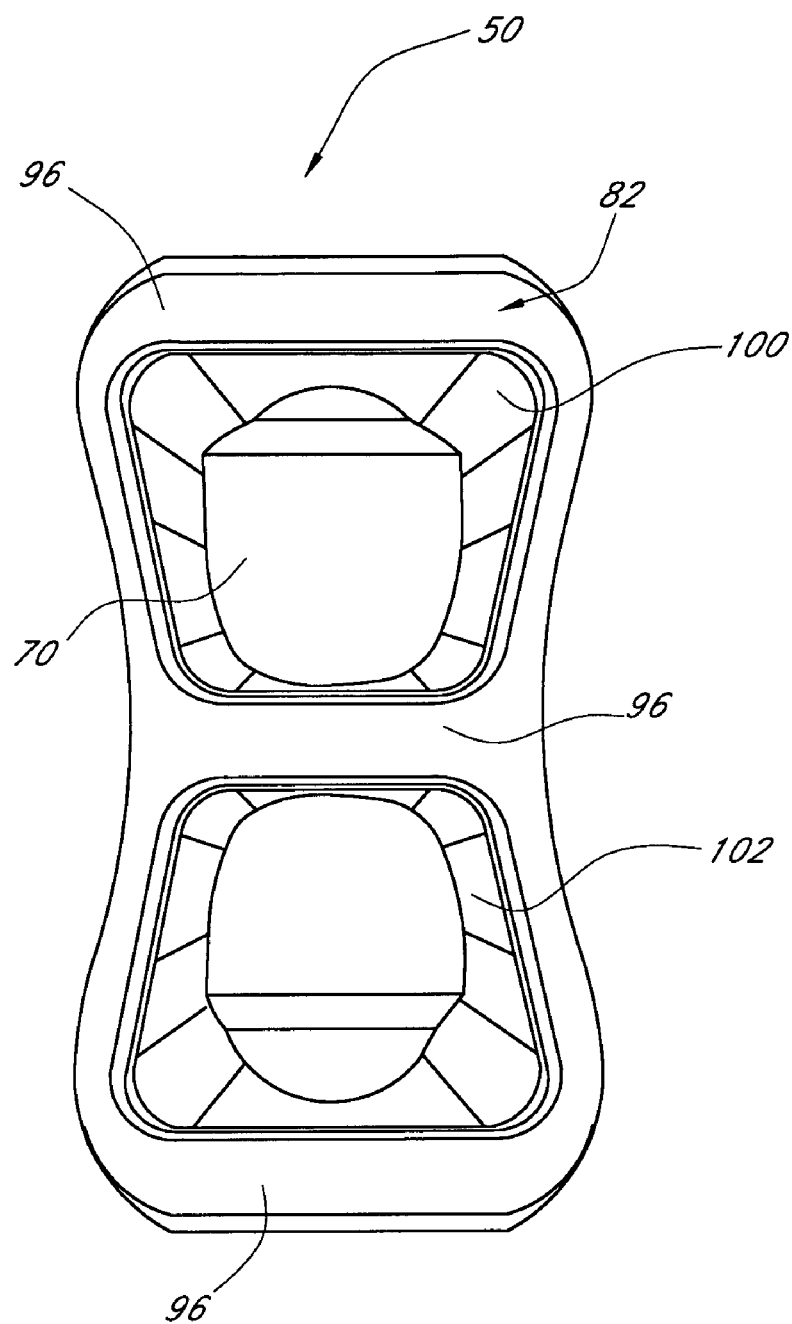
FIG. 8 is a rear view of the head tube of FIG. 3.

With reference to FIGS. 7 and 8, additional features of the head tube 50 are described. To further reduce weight, holes 100, 102 are provided in the back side 82 of the head tube 50 because material inside of the inner profile of the top and down tubes 52, 54 is unnecessary. Preferably, the holes 100, 102 extend through the wall of the head tube 50 and intersect the opening 70.

The holes 100, 102 may be of any suitable shape within the confines of the periphery of the top tube 52 and down tube 54, respectively. In conventional head tubes, the weight reducing holes (comparable to holes 100, 102) are circular in shape because circular holes are easier and cheaper to produce. However, to maximize the weight reduction, the holes 100, 102 are preferably shaped and sized to approximate the inner profile of the top tube 52 and the down tube 54 to enable the most material to be removed from the head tube 50. In order to obtain a desirable strength and stiffness to weight ratio, the top tube 52 and down tube 54 may be manipulated, or shaped, into a non-circular cross-sectional shape.

Weight reducing holes that approximate the shape of such exotically shaped tubing are more difficult to produce than round holes in a conventional head tube. However, with the head tube 50 produced by a preferred process as described herein, the holes 100, 102 may be easily, and inexpensively, produced in a large variety of complex shapes to correspond with the shape of the top tube 52 and down tube 54. Because depressions (which later form the holes 100, 102) are initially produced by a forging die and/or ram, they may take on complex shapes without the additional cost associated with producing complex shaped holes by a standard machining process. The depressions that form the holes 100, 102 are created to a depth, from an outer surface of the head tube 50, such that the depression are intersected by the opening 70. Thus, the depressions intersect with the opening 70 to create the holes 100, 102. Accordingly, the holes 100, 102 may assume complex shapes, but still be manufactured in an efficient and relatively inexpensive manner in comparison to convention head tubes. A preferred process for creating the openings 100, 102 by a forging process is described in greater detail below with reference to FIGS. 10–13.

Figure 9A:
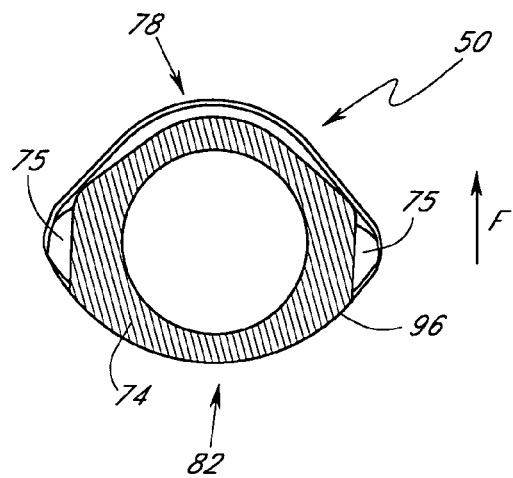
FIGS. 9A–9C are cross-sectional views of the head tube of FIG. 3.

FIG. 9A is a cross-sectional view of the head tube 50 near the upper end, or upper reinforced portion 74, of the head tube 50. This view illustrates the continuous curve of the weld surface 96 at this cross section at the upper portion 74 of the head tube 50. In addition, the upper end 74 of the head tube 50 defines an average wall thickness. A front portion 78 of the upper end 74 also defines an average wall thickness, generally forward of the steering axis $A_S$, and a back portion 82 of the upper end 74 defines an average wall thickness, generally rearward of the steering axis $A_S$.

Figure 9B:
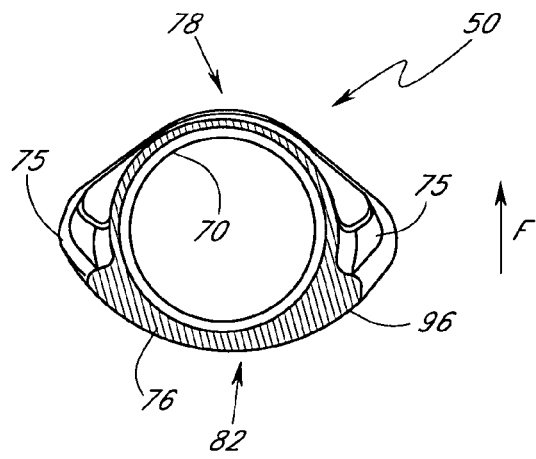

FIG. 9B is a cross-sectional view of the head tube 50 at the middle portion 76. This view illustrates the continuous curve of the weld surface 96 at the middle portion 76 of the head tube 50. The middle portion 76 also defines an average wall thickness. Furthermore, each of the front portion 78 and rear portion 82 define an average wall thickness.

Figure 9C:
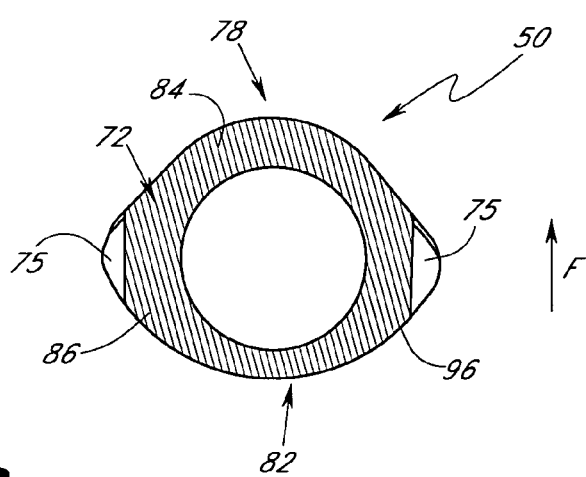
Figure 10:
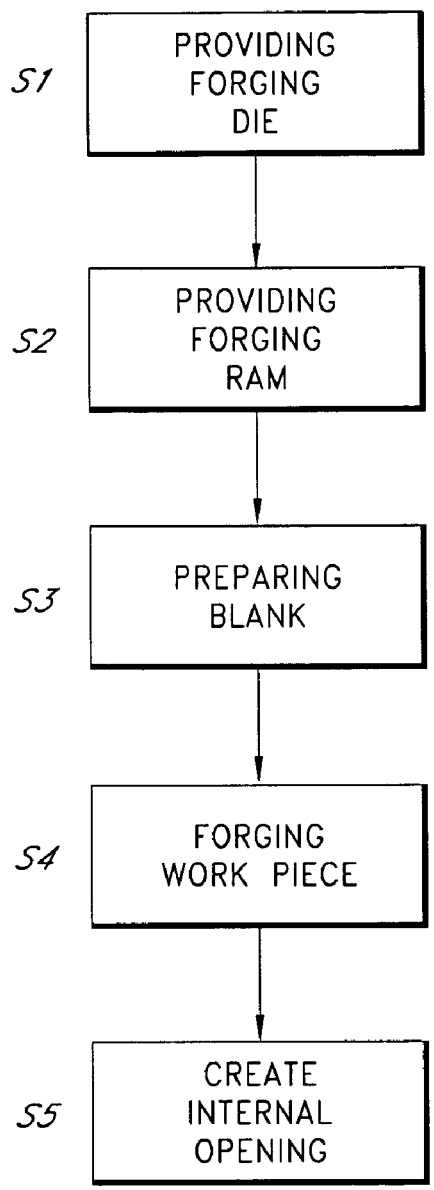
FIG. 10 is a flow chart of a manufacturing method for producing the head tube of FIG. 3.
Figure 11:
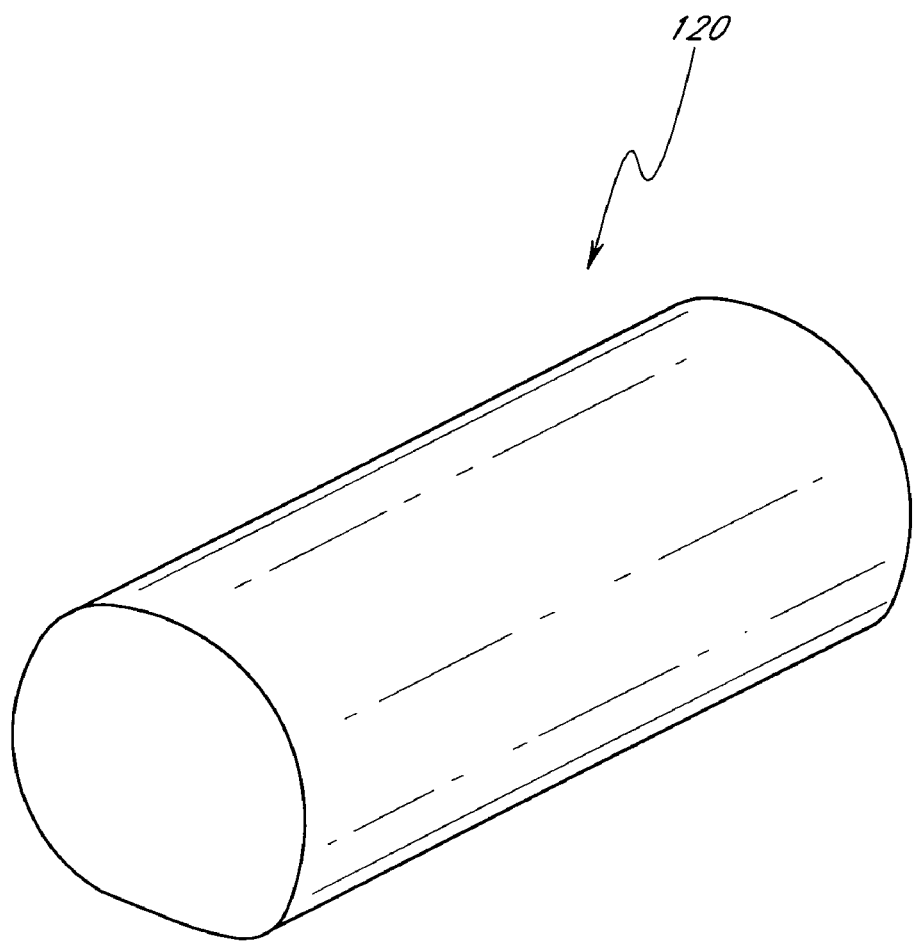
FIG. 11 is a perspective view of a forging blank used to produce the head tube of FIG. 3.

FIG. 9C is a cross-sectional view of the head tube 50 near the lower end, or lower reinforced portion 72. This view illustrates the continuous curve of the weld surface 96 at this cross section at the lower portion 72 of the head tube 50. The lower end 72 defines an average wall thickness and each of front and rear portions 78, 82 define an average wall thickness.

FIGS. 9A through 9C illustrate the varying wall thickness construction of the head tube 50, as discussed in detail above. For example, comparing the average wall thicknesses of the head tube 50 in FIGS. 9A and 9C with the wall thickness in FIG. 9B clearly illustrates the preferred construction of a greater average wall thickness in the upper and lower portions 74, 72 of the head tube 50 in comparison to the average wall thickness of the middle portion 78. Such a construction provides increased strength and durability to the upper and lower portions 74, 72 of the head tube 50, where stresses are higher, and reduces material in the middle portion 78 of the head tube, where the stresses are lower. In addition, preferably, the average wall thickness of the lower portion 72 is greater than an average thickness of the upper portion 74, due to the higher stresses in the lower portion 72 resulting from the added leverage of the front fork assembly 20, as described in detail above.

Furthermore, FIG. 9C clearly illustrates the preferred variation in wall thickness within at least the lower portion 72 of the head tube 50, wherein the forward portion 84 has a greater average wall thickness than the rearward portion 86. As described above, the rearward portion 86 receives support from the top tube 52 and down tube 54 in the assembled frame 14 and, therefore, may be provided with a lower wall thickness. Accordingly, the preferred head tube 50 advantageously optimizes both strength and weight. Similarly, the upper and middle portions 74, 76 may have a differing average wall thickness between the front portion 84 and the back portion 86 to optimize the strength-to-weight ratio of the entire length of the head tube 50. In some instances, the front portion 84 may have a lower average thickness than the back portion 86 within the upper and middle portions 74, 76 depending on the overall structure of the head tube 50, top tube 52 and down tube 54.

A preferred method for manufacturing a head tube 50 of complex shape and including complex shaped holes, is described with reference to FIGS. 10–13. Step S1 involves providing a forging die. Preferably, a surface of the die comprises relieved features that are intended to be impressed on to the head tube 50 during the forging process. For example, the structure that provides the reinforcement portions 72, 74 will be relieved into the die and will be impressed into a forging blank 120, shown in FIG. 11. Thus, the die preferably includes desired features reversed and relieved on the surface. The die is preferably made of a material that is harder than the material of the head tube 50, or forging blank 120, at the working temperatures during the forging process. Because the die is of harder, features on the surface of the die will be impressed into the softer blank 120.

Step S2 involves providing a forging ram. Preferably, a surface of the ram comprises relieved features that are intended to be impressed on to the head tube 50. For example, the structure that provides the complex shaped holes 100, 102 is relieved into the ram face and will be impressed into the forging blank 120. Thus, the ram preferably includes the desired features reversed and relieved on its surface. The ram is preferably made of a material which is harder then the material of the head tube 50, or forging blank 120, at the working temperatures during the forging process.

Step S3 involves forming the blank 120 that will be used in the forging process. The blank 120 is desirably generally close to the mass of the final head tube 50 and, preferably, roughly the same mass as the final head tube plus the mass removed to form the opening 70. It will be appreciated that "roughly the same mass" includes a blank having greater mass than the final head tube 50 and creating excess material, or flash, between the die and ram. Thus, additional process steps may be included to remove any flash from the blank 120, such as the use of a cutting die, machining or grinding, for example.

Preferably, however, the blank 120 is similar in dimension to the finished head tube to reduce the force needed in the forging process. The blank 120 preferably is also roughly the same length as the final head tube 50. For example, if the finished head tube 50 is 6 inches in length, the blank 120 should be formed to a similar length that accounts for expansion lengthwise during the forging process. The blank 120 also should be roughly the width and thickness of the final head tube. For example, if the head tube 50 is 2 inches thick and 3 inches wide, the blank 120 should be roughly the those dimensions, accounting for mass displacement.

In one embodiment, a casting 120 (FIG. 11) is preferably used which approximates the finished shape of the head tube 50. In another embodiment, preferably bar stock of appropriate dimensions can be cut to the approximate length of the final head tube 50 and used in the forging.

Figure 12:
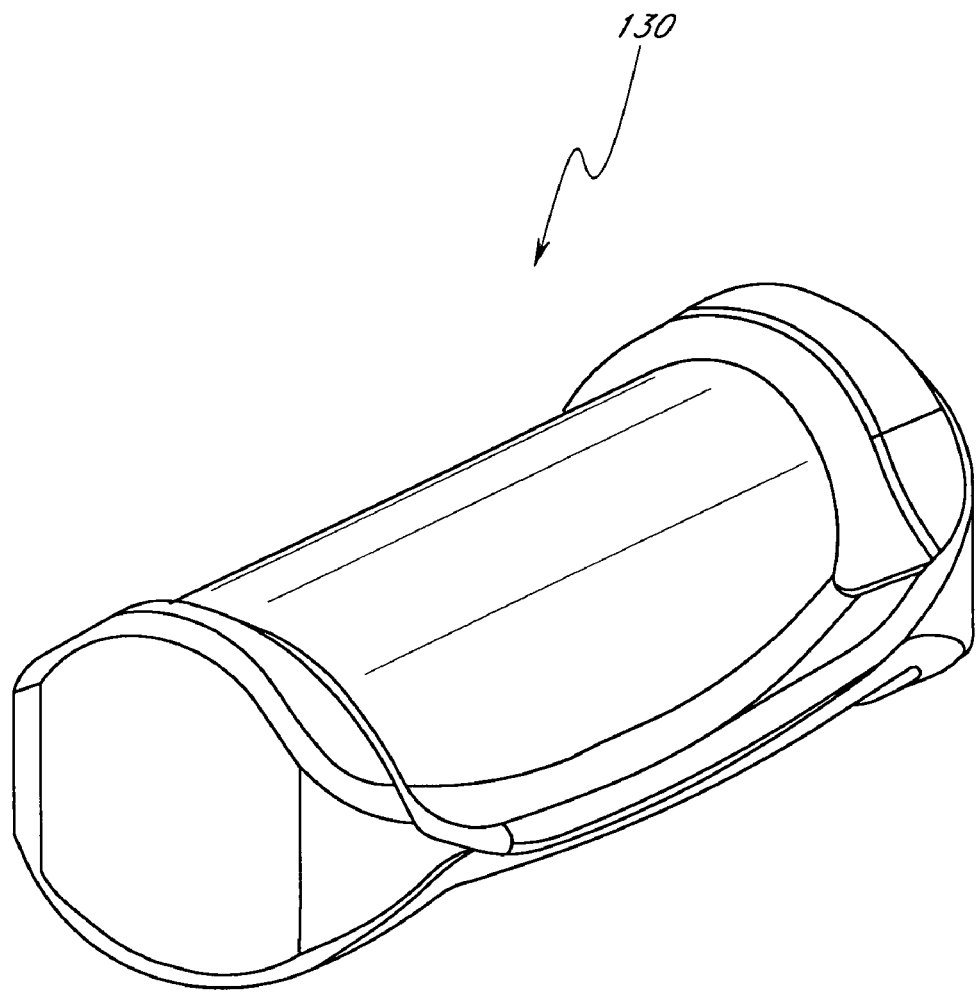
FIG. 12 is a perspective view of a work piece formed from the forging blank of FIG. 11 by a forging process.
Figure 13:
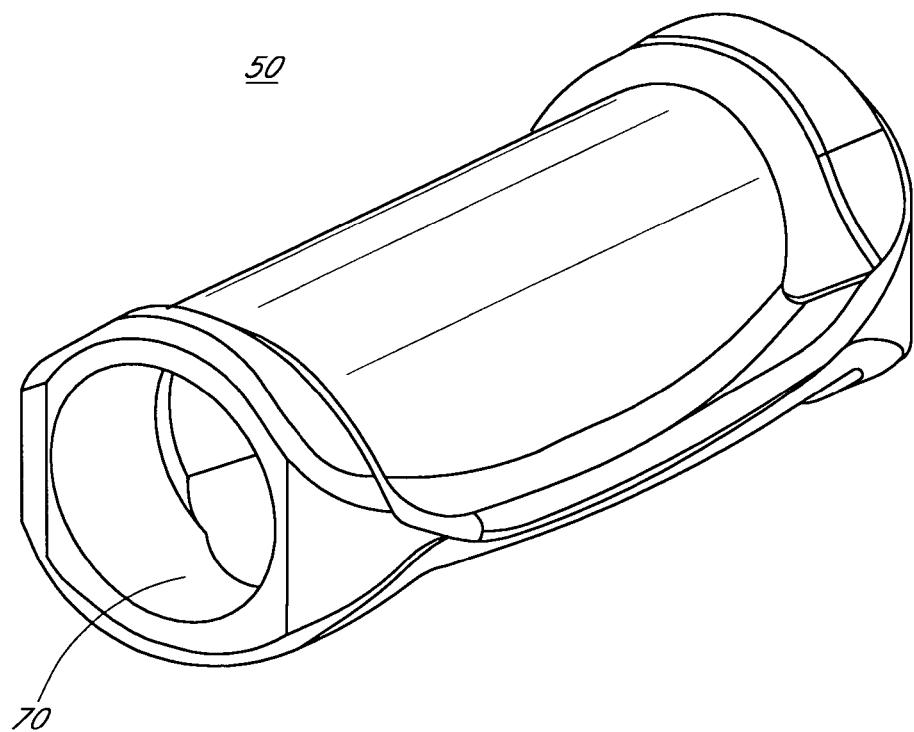
FIG. 13 is a perspective view of the completed forged head tube formed from the work piece of FIG. 12.

Step S4 involves forging the blank 120. A ram (preferably as described above) presses the blank 120 in to a die (preferably as described above) and forces the blank 120 material to conform to the shape of the die and ram face resulting in a partially processed head tube 50, or work piece 130 (FIG. 12). Both the die and the ram hold relieved features to forge into the blank 120. The die or ram can forge complex indentations into the blank 120, such as the non-round indentations needed for producing complex shaped holes 100, 102 on the back side 82 of the head tube 50 (FIGS. 7 and 8). After the forging process, the blank 120 preferably has the external dimensions of the finished head tube 50.

Step S5 involves creating the opening 70. An opening 70 is cut through the work piece 130 length wise (along the steering axis $A_S$) for receiving the steer tube 66 of the front suspension fork 20. Any features forged into the work piece 130 with a depth great enough to extend into the volume of material removed by the creation of the opening 70 will produce an additional opening that intersects with the opening 70. For example, the weight reducing holes 100, 102 on the back side of the head tube 50 are preferably formed by the creation of the opening 70 intersecting the depressions corresponding to the holes 100, 102 made by the forging process. Desirably, once the opening 70 is created, the work piece 130 is essentially in the final form of the head tube 50.

Although it is preferred that the process steps S1–S5 are performed in the above-described order to produce a head tube 50, the process steps may be completed in an alternative order and still provide advantages over conventional processes for producing head tubes. Furthermore, not all of the steps are necessarily required and additional process steps may be added. For example, as described above, if flash is present on the blank, or work piece, additional process steps may be utilized to remove the flash. Other additional process steps may also be included, as will be appreciated by one of skill in the art.

Figure 14:
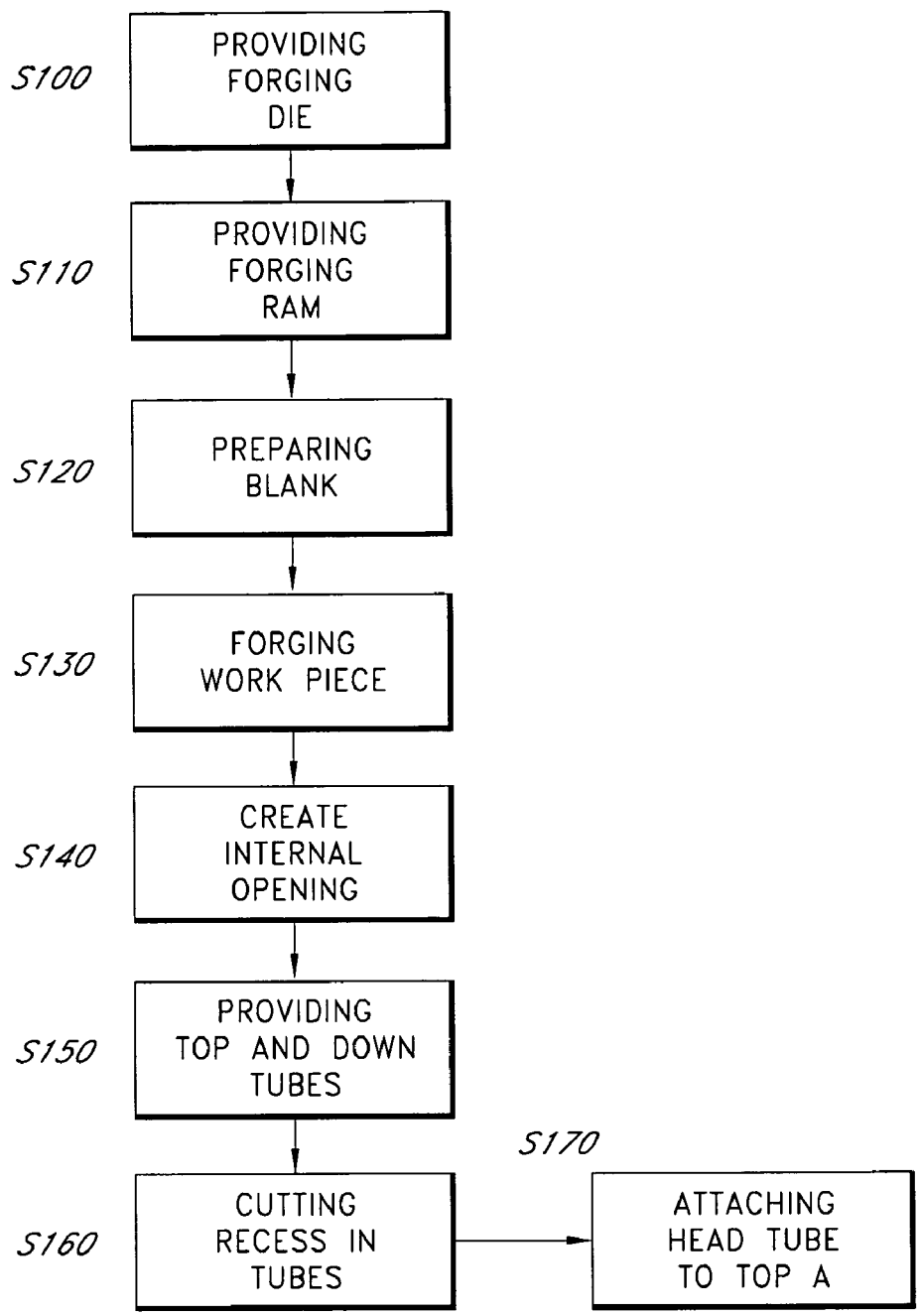
FIG. 14 is a flow chart of a manufacturing method for producing a junction between the head tube and the top and down tubes.
Figure 15:
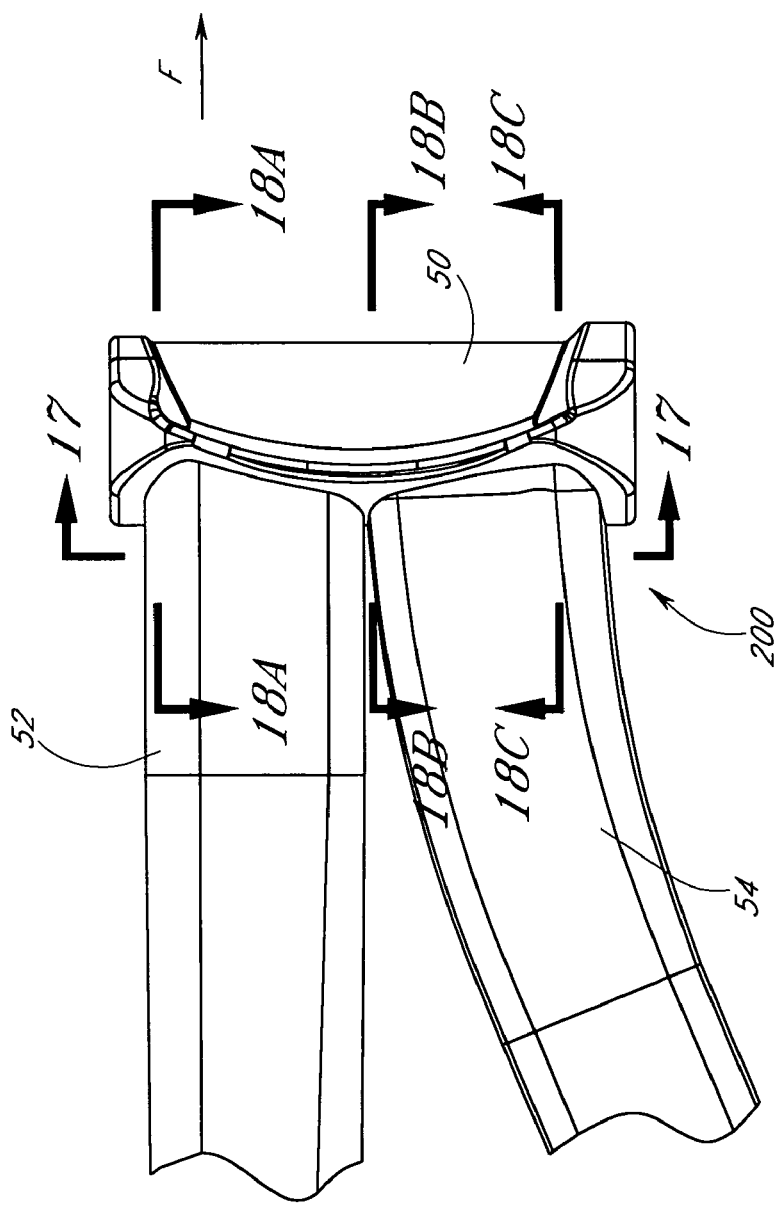
FIG. 15 is a partial, side elevational view of a head tube junction produced by the method of FIG. 14.

With reference to FIGS. 14–20 the junction 200 formed by the head tube 50, top tube 52 and bottom tube 54 is described in greater detail. FIG. 14 is a flow chart of a preferred method for manufacturing a head tube junction 200.

Step S100 involves providing a forging die (not shown). Preferably the die comprises relieved features that are intended to be impressed on to the head tube 50. For example, the structure that provides the reinforcement portions 72, 74 is relieved into the die and will be impressed into a forging blank, such as the blank 120 of FIG. 11. The die contains the desired features reversed and relieved on the surface. The die is preferably made of a material which is harder then the material the head tube 50 is made of at the working temperatures during the forging process. Because the die is of harder material, features on its surface will be impressed into the softer material of the blank 120.

Step S110 involves providing a forging ram (not shown). Preferably, the ram comprises relieved features that are intended to be impressed on to the head tube 50. For example, the structure that provides the complex shaped holes 100, 102 is relieved into the ram face and will be impressed into the forging blank 120. The ram contains the desired features reversed and relieved on its surface. The ram is preferably made of a material which is harder than the material the head tube 50 at the working temperatures of the forging process.

Step S120 involves forming the blank 120 used in a forging process to produce the head tube 50. The blank 120 is preferably roughly the same mass as the final head tube 50 plus the mass removed to form the opening 70. "Roughly" the same means the range of masses that will allow a forging process to form a bicycle head tube 50.

Preferably, the blank 120 is similar in dimension to the finished head tube 50 to reduce the force needed in the forging process. The blank 120 preferably is roughly the same length as the final head tube 50. For example, if the finished head tube 50 is 6 inches in length, the blank 120 should be formed to a similar length that accounts for expansion length wise during the forging process. The blank 120 should be roughly the width and thickness of the final head tube 50. For example, if the head tube 50 is 2 inches thick and 3 inches wide, the blank 120 should be roughly the those dimensions, accounting for mass displacement.

In one embodiment, preferably a casting 120 (FIG. 11) is used in the forging process. Desirably, the casting 120 approximates the finished shape of the head tube 50. In another embodiment, preferably bar stock of appropriate dimensions can be cut to the approximate length of the head tube 50 and used in the forging process.

Step S130 involves subjecting the blank 120 to a forging process. A ram (preferably as described above) presses the blank 120 into a die (preferably as described above) and forces the blank 120 material conform to the shape of the die and ram face resulting in a partially finished head tube 50, or work piece 130 (FIG. 12). Both the die and the ram hold relieved features to forge into the blank 120. The die or ram can forge complex indentations into the blank 120, such as the non-circular indentations for producing the complex shaped holes 100, 102 on the back side 82 of the head tube 50. After the forging process, the work piece 130 preferably has the external dimensions of the finished head tube 50.

Step S140 involves creating the opening 70. An opening 70 is cut through the work piece length wise (along the steering axis $A_S$) for receiving the steer tube 66 of a fork 20. Any features forged into the work piece 130 with a depth great enough to extend into the volume of material removed by the creation of the opening 70 will produce an additional opening intersecting the opening 70. For example, the weight reducing holes 100, 102 on the back side of the head tube 50 are formed by the volume removed by the creation of the opening 70 intersecting the depressions, corresponding to the holes 100, 102, formed during the forging process.

Step S150 involves providing frame tubing to form the top tube 52 and down tube 54 to complete the head tube junction 200. Preferably the frame tubing is constructed of similar material to the head tube 50 to aid in the ease of attachment. For example, when welding two dissimilar kinds of metal the joint that is formed may not be of expected strength. If the metals are too dissimilar, they may not behave predictably or mix while in the liquid form, and may combine with undesirable characteristics. Alternatively, an additional component, such as a lug, that is capable of being joined to the head tube 50 by welding may be used to connect dissimilar frame material to the head tube 50.

Step S160 involves cutting a recess R (the hatched area illustrated in FIG. 18A) into the planar end of the frame tubes, or "mitering" the frame tubes. As described above the head tube 50, in one embodiment, preferably has an extension of a constant radius. A constant radius of the surface 96 created by the extension of the head tube 50 allows the use of simple, circular cuts in the mating portions of the frame tubes. In Step S160 of this embodiment, simple radial cuts are cut into the mating ends of the top and down tube 52, 54.

Step S170 involves attaching the head tube 50 to the top tube 52 and down tube 54. Preferably, when working with aluminum tubing a weld is used for joining. By providing a head tube 50 defining an attachment surface 96 having a constant radius and frame tubes (top tube 52 and down tube 54) cut with a corresponding radius recess at the mating ends, the welding process will produce strong, consistent welds, with little gap filling required. Furthermore, such a method allows for the production of a complex shaped head tube 50. Accordingly, the shape of the head tube 50 may be designed, at least in part, in an effort to heat distribution during the welding of the top tube 52 and down tube 54 to the head tube 50, such as by manipulating the amount of material provided near the welding zones of the head tube 50, as will be appreciated by one of skill in the art.

Although it is preferred that the process steps S100–S170 are performed in the above-described order to produce a head tube junction 200, the process steps may be completed in an alternative order and still provide advantages over conventional processes for producing head tubes. Furthermore, not all of the steps are necessarily required and additional process steps may be added.

Figure 16:
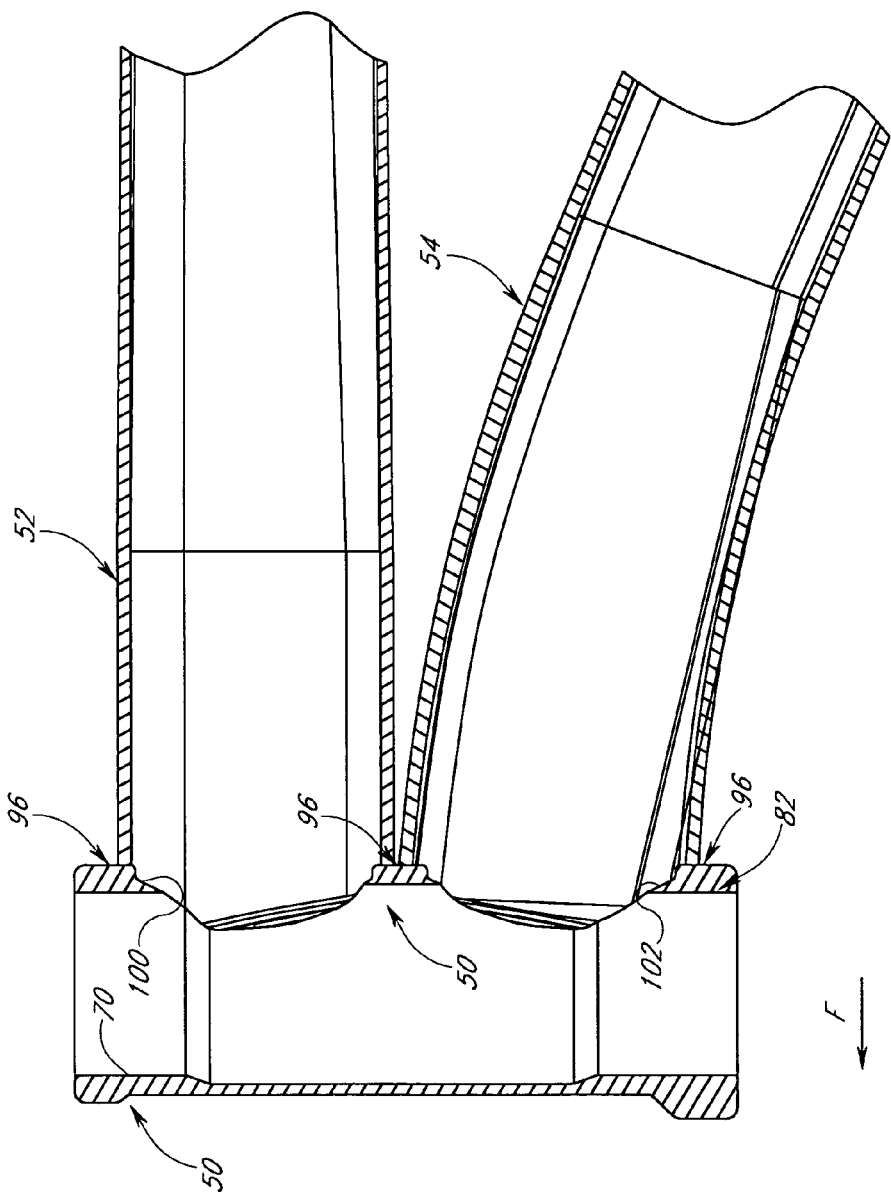
FIG. 16 is a cross-sectional view of the head tube junction of FIG. 15, taken along a vertical, central plane of the bicycle.
Figure 17:
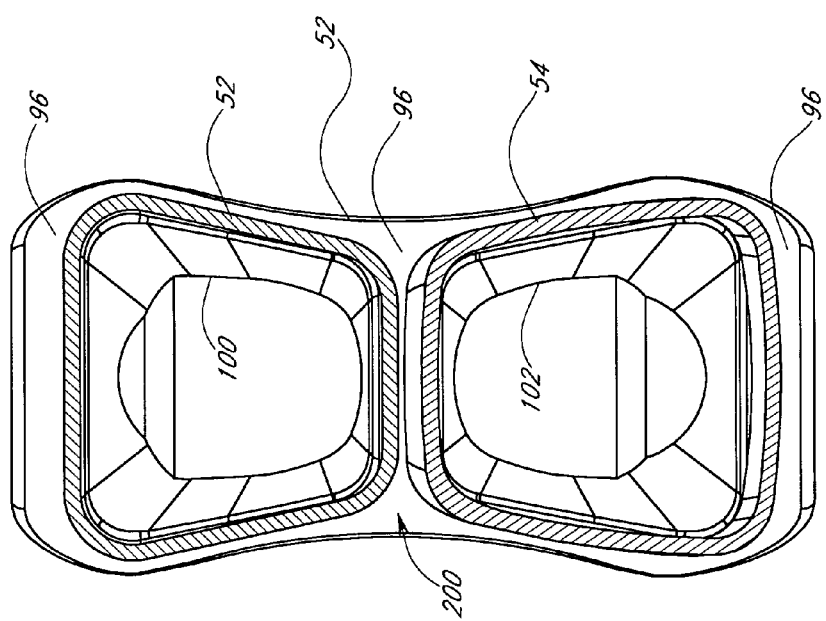
FIG. 17 is a partial cross-sectional view of the head tube junction of FIG. 15 taken along the line 17—17 of FIG. 15.

FIG. 16 illustrates a cross-section of the head tube 50, down tube 54 and top tube 52 joined with the above method to form a head tube junction 200. This figure illustrates the bottom tube 54 being attached to the back side 82 of head tube 50 at the weld surface 96. The top tube 52 is also secured to the upper most weld surface 96. Desirably, each of the top and down tubes 52, 54 are joined to the head tube 50 by a welded bead along substantially the entire periphery of the tubes 52, 54 and corresponding areas of the surface 96 defining the periphery of the holes 100, 102, as shown in FIG. 17. However, in some instances, facing or overlapping surfaces of the top tube 52 and down tube 54 may be welded to one another, rather than to the head tube 50. Such an arrangement may be used on smaller frame sizes due to a limitation on the desirable length of the head tube 50, which is less than the combined vertical dimensions of the top and down tube 52, 54.

Figure 18A:
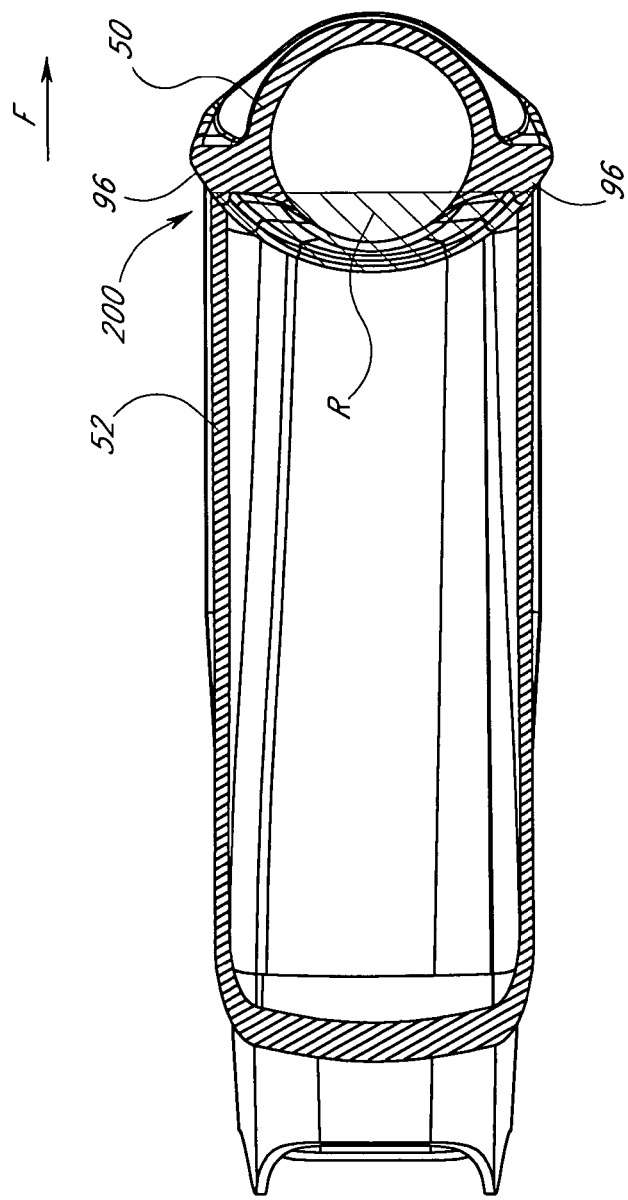
Figure 18B:
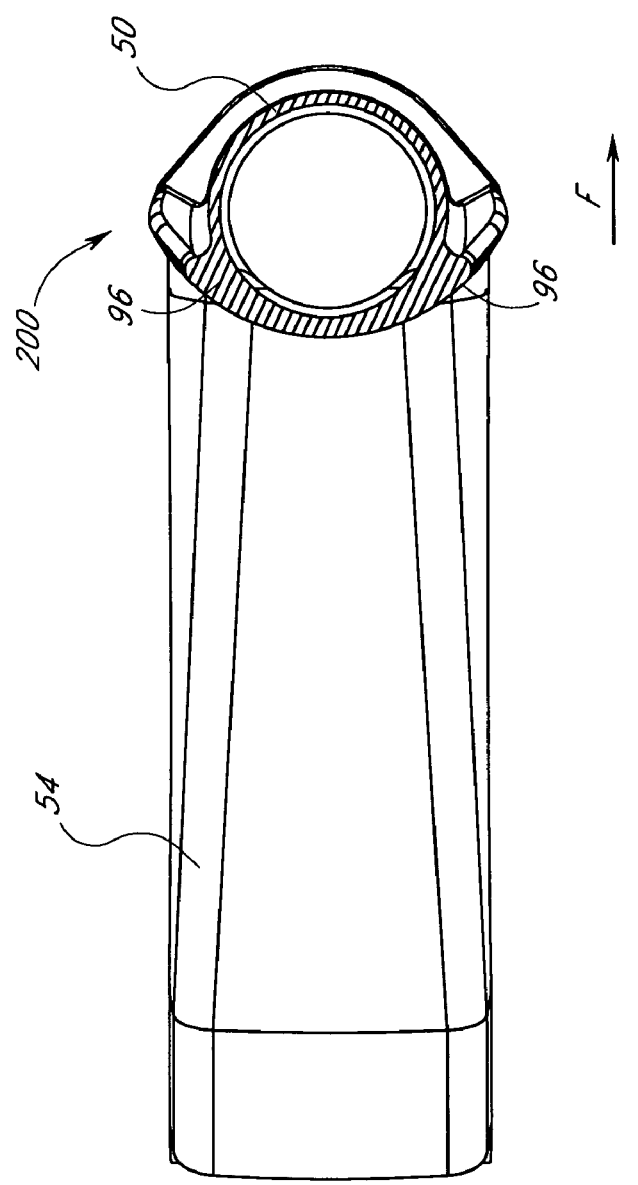

FIGS. 18A, 18B and 18C are cross-sectional views taken along the upper end, middle lower end of the junction 200, respectively. The FIGS. 18A, 18B and 18C generally correspond with the cross-section views of the head tube 50 of FIGS. 9A, 9B and 9C, respectively, except that the tubes 52 or 54, as appropriate, are shown. FIGS. 18A and 18C illustrate the junction between the head tube 50 and the top tube 52 and down tube 54, respectively.

Although the present invention has been disclosed in the context of several preferred embodiments, it will be understood by those of skilled in the art that the scope of the present invention extends to alternative embodiments and/or uses of the invention and obvious modifications and equivalents thereof. For example, certain features of the disclosed head tube 50 may be utilized alone, without the additionally disclosed features. In one contemplated arrangement, a head tube is provided having a varying wall thickness between forward and rearward portions thereof. In another contemplated arrangement, a head tube is provided having an enlarged, constant radius attachment surface. Accordingly, the invention is not intended to be limited to the specifically disclosed embodiments, but is intended to be defined solely by the appended claims.

What is claimed is:

1. A head tube for a bicycle comprising;
    a body comprising an inner surface defining an opening having a first radius sized and shaped to receive a standard size steer tube, said opening defining a first axis, said body further defining an annular outer surface, said body comprising:
    an upper portion;
    a lower portion;
    a middle portion disposed between said upper portion and said lower portion;
    wherein at least one of the portions at least partially defines a first extension extending radially outward from said outer surface, said first extension defining a first extension surface cooperating with at least a portion of said outer surface to define a rearward-facing mounting surface configured to accept the attachment of at least a portion of a frame tube, said body defining a hole adjacent said mounting surface, wherein said hole is surrounded by the frame tube when the frame tube is attached to said head tube.

2. The head tube of claim 1 wherein;
    at least one of the portions at least partially defines a second extension extending radially outward from said outer surface, said second extension defining a second extension surface cooperating with at least a portion of said outer surface to accept the attachment of at least a portion of a frame tube.

3. The head tube of claim 2, wherein each said extension comprises a flange.

4. The head tube of claim 1, wherein at least a portion of said outer surface defines a constant radius profile for accepting the attachment of at least a portion of a frame tube.

5. The head tube of claim 4, wherein said first extension surface defines a second axis which is non-coaxial with said first axis.

6. The head tube of claim 1, wherein at least a portion of said outer surface and said first extension surface cooperate to define a constant radius profile for accepting the attachment of at least a portion of a frame tube.

7. The head tube of claim 1, said upper portion comprising an upper annular strengthening ring.

8. The head tube of claim 1, said lower portion comprising a lower annular strengthening ring.

9. The head tube of claim 1, further comprising;
    an upper annular strengthening ring,
    an lower annular strengthening ring,
    at least one extension extending at least partially between said upper ring and said lower ring.

10. The head tube of claim 1, wherein said body is constructed from an aluminum material.

11. A head tube for a bicycle comprising;
    a body comprising an inner surface defining an opening having a first radius sized and shaped to receive a standard size steer tube, said opening defining a first axis, said body further defining an annular outer surface, said body comprising:
    an upper portion;
    a lower portion;
    a middle portion disposed between said upper portion and said lower portion;

wherein at least one of the portions at least partially defines a first extension extending radially outward from said outer surface, said first extension defining a first extension surface cooperating with at least a portion of said outer surface to accept the attachment of at least a portion of a frame tube, at least a portion of said outer surface and said first extension surface cooperating to define a constant radius profile for accepting the attachment of at least a portion of a frame tube;

wherein the axis of said constant radius profile is non-coaxial with said first axis.

12. A head tube for a bicycle, comprising:
a unitary body comprising an inner surface defining an opening having a first radius sized and shaped to receive a standard size steer tube, said opening defining a first axis that lies substantially within a longitudinally-extending, vertical plane, said unitary body further defining an annular outer surface defining a second radius and a second axis that lies substantially within said longitudinally-extending, vertical plane, said unitary body comprising:
an upper portion;
a lower portion;
a middle portion disposed between said upper portion and said lower portion;
wherein said outer surface has a portion of constant radius profile surface for accepting the attachment of frame tubes, wherein said first axis and said second axis are non-coaxial.

13. The head tube of claim 12, wherein said first axis and said second axis are generally parallel to one another.

14. The head tube of claim 12, wherein an upper end of said opening is configured to receive an upper bearing assembly and a lower end of said opening is configured to receive a lower bearing assembly, said upper and lower bearing assemblies configured to cooperate to rotatably support a steer tube relative to said head tube.

15. The head tube of claim 12, wherein said unitary body is constructed from an aluminum material.

16. A head tube for a bicycle comprising:
a body comprising an inner surface defining an opening sized and shaped to receive a standard size steer tube, said opening defining a first axis, said body further defining an annular outer surface defining a second radius, said body comprising:
an upper portion;
a lower portion;
a middle portion disposed between said upper portion and said lower portion;
said upper portion having a front portion and back portion,
said lower portion having a front portion and back portion,
said middle portion having a front portion and back portion,
said upper portion having a greater average wall thickness than said middle portion, and
said lower portion having a greater average wall thickness than said middle portion, and said front portion of the lower portion having a greater average wall thickness than the back portion of the lower portion.

17. The head tube of claim 16, wherein said lower portion has a greater average wall thickness than said upper portion.

18. The head tube of claim 16, wherein at least a potion of said outer surface has a constant radius profile for accepting the attachment of over-sized frame tubes at full width.

19. The head tube of claim 16, wherein said body is constructed from an aluminum material.

* * * * *

UNITED STATES PATENT AND TRADEMARK OFFICE
CERTIFICATE OF CORRECTION

| | | |
|---|---|---|
| PATENT NO. | : 7,052,028 B2 | Page 1 of 1 |
| APPLICATION NO. | : 10/459398 | |
| DATED | : May 30, 2006 | |
| INVENTOR(S) | : Jason L. Chamberlain | |

It is certified that error appears in the above-identified patent and that said Letters Patent is hereby corrected as shown below:

Column 1, (Assignee), please delete "Componets" and insert --Components,-- therefore.
Column 14, line 28, in Claim 2, delete "claim 1" insert --claim 1,-- therefore.
Column 14, line 53, in Claim 9, delete "an" and insert -- a--, therefore.
Column 16, line 29, in Claim 18, delete "potion" and insert --portion--, therefore.

Signed and Sealed this

Ninth Day of January, 2007

JON W. DUDAS
*Director of the United States Patent and Trademark Office*